United States Patent [19]

Jamison

[11] Patent Number: 5,591,808
[45] Date of Patent: Jan. 7, 1997

[54] ACETAL-BASED SELF LUBRICATING COMPOSITIONS

[75] Inventor: Warren E. Jamison, Edmonds, Wash.

[73] Assignee: E/M Corporation, West Lafayette, Ind.

[21] Appl. No.: 316,892

[22] Filed: Oct. 3, 1994

[51] Int. Cl.$^6$ .............................. C08L 59/02; C08L 71/02
[52] U.S. Cl. ..................... 525/403; 525/154; 525/405
[58] Field of Search ................................ 525/405, 154, 525/403

[56] References Cited

U.S. PATENT DOCUMENTS

| | | | |
|---|---|---|---|
| 3,135,564 | 6/1964 | Agens | 308/187 |
| 3,541,011 | 11/1970 | Davis et al. | 252/12 |
| 3,547,819 | 12/1970 | Davis et al. | 252/12 |
| 3,729,415 | 4/1973 | Davis et al. | 252/25 |
| 4,041,002 | 8/1977 | Aboshi et al. | 260/30.6 R |
| 4,146,487 | 3/1979 | Rumierz | 252/12 |
| 4,274,986 | 6/1981 | Ikenaga et al. | 260/22 CQ |
| 4,351,916 | 9/1982 | Kohan | 524/377 |
| 4,448,700 | 5/1984 | Lankamp | 252/12.4 |
| 4,486,319 | 12/1984 | Jamison | 252/12.2 |
| 4,559,380 | 12/1985 | Kasuga et al. | 524/317 |
| 4,647,609 | 3/1987 | O'Brien | 524/267 |
| 4,649,179 | 3/1987 | Takagaki | 525/400 |
| 4,915,856 | 4/1990 | Jamison | 252/26 |
| 4,945,126 | 7/1990 | Crosby et al. | 524/507 |
| 5,079,287 | 1/1992 | Takeshi et al. | 524/528 |
| 5,346,737 | 9/1994 | Takahashi et al. | 428/36.9 |

OTHER PUBLICATIONS

Brown, William L., "Polyalkylene Glycols," CRC Handbook of Lubrication and Tribology, vol. III, © 1992 Union Carbide Chemicals & Plastics Technology Corporation, pp. 253–267.

Dow Polyglycols, Polyglycol Handbook, Dow Chemical Company, 1988, 4pages.

Gunderson & Millett, "Polyglycols," Synthetic Lubricants, Reinhold Pub. Co., NY, 1962, Chapter 3, pp. 61–102.

Mueller & Martin, "Polyalkylene Glycol Lubricants: Uniquely Water Soluble," Journal of the American Society of Lubrication Engineers, Presented at the 29th Annual Meeting in Cleveland, Ohio, Apr. 28–May 2, 1974, vol. 31, 7, pp. 348–356.

General Property Guide for DELRIN Acetal Resins, 2pages.

Dow Polyglycols, summary of physical properties, etc., 3pages.

"UCON® Fluids and Lubricants," General Information and Physical Properties, 3pages.

General Information/Property Guide for DELRIN Acetal Resins, DuPont, 4pages.

"EMERY® Synthetic Lubricant Basestocks," Henkel Corporation Emery Group, 11501 Northlake Drive, Cincinnati, OH 45249, 4pages.

*Primary Examiner*—W. Robinson H. Clark
*Attorney, Agent, or Firm*—Ronald M. Anderson

[57] ABSTRACT

A composition of acetal resin infused with one or more polyglycols to impart an improved tribological property. The composition is produced by mixing a powdered or granulated polyoxymethylene homopolymer (or copolymer) in the range from about 75% to about 95% by weight, with from about 25 to about 5% by weight of one or more polyglycols. Examples disclosed include compositions in which the single polyglycol comprises a polyethylene glycol, an ethylene oxide-propylene glycol monobutyl ether, a diethylene glycol n-butyl ether, an ethylene oxide-propylene oxide polyglycol, and a propylene glycol monobutyl ether. Preferably, if an oil soluble polyglycol is added, either a polyethylene glycol or a propylene glycol monobutyl ether is included to serve as a compatibilizer for the oil soluble polyglycol. One preferred embodiment includes 80% by weight of the powdered acetal, 14% by weight of the polyethylene glycol, which serves as the compatibilizer, and 3% by weight of the ethylene oxide-propylene glycol monobutyl ether, which is the oil soluble polyglycol. This example exhibits a substantially reduced friction coefficient and a much greater contact stress withstand level than acetal resin that does not include a polyglycol. The composition is prepared by mixing the components in an extrusion machine or in a torque rheometer while applying heat. A strand of the composition is thus extruded and cut into pellets suitable for injection molding into various types of desired objects.

28 Claims, 3 Drawing Sheets

ACETAL-BASED SELF LUBRICATING COMPOSITIONS

FIELD OF THE INVENTION

The present invention generally relates to lubricant compositions, and more specifically, to solid lubricant compositions that are self lubricating through bleeding of a lubricant onto the surface of the composition.

BACKGROUND OF THE INVENTION

Polymeric compositions, which incorporate lubricating oils that bleed to the surface of the composition to perform a lubricating function, have been disclosed in the prior art. In U.S. Pat. No. 4,486,319, Jamison, the inventor of the composition claimed below, showed that the properties of certain plastics able to exude oil can be modified by incorporating solid materials to conduct away frictional heat. Further, in U.S. Pat. No. 4,915,856, he described a lubricating composition formed of polymers, oils, and both solid and liquid agents that were added to modify the lubricating performance of the composition.

Other plastic compositions that have improved tribological properties include thermoplastic resins in which various solid and liquid lubricants are incorporated into their structure, such as polyethylene, polyamide (nylon), and polyoxymethylene (acetal). Solid lubricants that have been incorporated into nylon and acetal include powders of graphite, molybdenum disulfide, and polytetrafluoroethylene (PTFE). In addition, PTFE fibers have been randomly dispersed in certain plastic resins. In U.S. Pat. No. 4,945,126, Crosby and Theberge blended polyethylene and PTFE to form an additive for use in a nonspecific resin system, to reduce friction and wear. Examples of molded and extruded solid forms of acetals containing PTFE are DELRIN AF™ (DuPont Corporation) and LUBRICOMP KL4010™, 4020™, and 4030™ (LNP Engineering Plastics, Inc.). Nylon compositions that contain molybdenum disulfide are NYLATRON GS™ and NYLATRON GSM™ (Polymer Corporation).

Solid lubricants that are incorporated into resin systems for use in forming structural components, such as bearings and gears, generally exist as dispersed separate phases. In contrast, resin systems that incorporate liquid lubricants into their structure to achieve improved tribological properties either create dispersed separate phases of the liquid and solid or totally dissolve the liquid in the solid resin phase. Compositions in which the liquid remains totally dissolved in the resin do not provide optimum lubrication. In fact, much better lubrication performance is observed when the liquid is slowly rejected from the interior of the composition to continually form a thin film on the surface of objects made from the resin. To achieve this result, it is best to select a liquid lubricant and a resin system that have limited mutual solubility, and to process the composition so that the liquid is dispersed within the resin and bleeds to the surface at a limited rate. Bearing compositions are disclosed by Lankamp in U.S. Pat. No. 4,448,700; these compositions comprise specific neopentylpolyol esters dispersed in polypropylene. Takishi et al. disclose polyethylene formulations in U.S. Pat. No. 5,079,287 that incorporate both liquid and solid lubricants. Other examples of related lubricant compositions are discussed in U.S. Pat. No. 3,135,564 (using vinyl chloride); U.S. Pat. No. 4,146,487 (using polymethyl pentene); U.S. Pat. Nos. 3,541,011; 3,547,819; and 3,729,415 (in which Davis et al. teach formulation of lubricant dispensing materials from polyethylenes).

Silicone oils have been infused into a variety of polymers, such as nylon, to improve their tribological properties. Examples include PLASLUBE™ NY-1/SI/5 (Ako Engineering Plastics, Inc.), and STANYL™ TW341 (DSM Engineering Plastics).

Representative internally lubricated acetals are FULTON 441™ (LNP Engineering Plastics), ACETRON NS™ (Polymer Corporation), CELCON LW90™ (Hoechst-Celanese Corporation), and DELRIN 500CL™ (DuPont Corporation). In each of these prior art oil infused compositions, the oils are totally dissolved within the solid polymer, and thus, do not provide optimum lubrication. In the commercial composition OILES 80™ (Oiles America Corporation), a liquid lubricant is dispersed in an acetal resin, but the lubricant does not diffuse throughout the polymer and is only released as wear of the polymer exposes pockets of the oil.

Infusion of silicone oils and other lubricating oils into acetals in amounts sufficient to optimize the tribological properties of the composition have been found to impair the ability to process these compositions into useful objects by extrusion or injection molding. This problem arises due to the inherent immiscibility of acetals and most lubricating oils. Specifically, when pellets of highly oil-infused acetals are loaded into an injection molding machine or extruder, the heat generated by the machine causes oil to bleed to the surface of the pellets. The oil then transfers to the screws and barrels of the machine and lubricates their surfaces so that the frictional forces developed within the machine are inadequate to create the pressures within the dies required to form the material. This problem, which is recognized in the prior art, is referred to as a "transport problem."

In U.S. Pat. No. 4,041,002, Aboshi et al. teach a method to improve the transport properties of oil-infused acetals. They note that by mixing with the acetal an amount of an ethylene vinyl acetate sufficient to absorb the oil, the resulting composition can be pelletized for subsequent molding or extrusion. The types of oils that they employ are restricted to those that are insoluble in acetal, but soluble in ethylene vinyl acetate. However, to achieve the concentration of oil required for acceptable tribological performance, a relatively large concentration of ethylene vinyl acetate must be added, which degrades the mechanical performance, and processing of the resulting composition.

SUMMARY OF THE INVENTION

The present invention deals with lubricating compositions made using the polymer acetal. A self-lubricating plastic composition is defined that in one form, comprises from about 75% by weight to about 95% by weight of a polyoxymethylene polymer (acetal), and from about 5% by weight to about 25% by weight of a mixture of polyglycols. At least one polyglycol comprising said mixture of polyglycols serves as a compatibilizer because of its characteristic solubility in the polyoxymethylene polymer. Another of the polyglycols has a characteristic coefficient of friction that is substantially less than that of both the polyoxymethylene polymer and the compatibilizer and is substantially soluble in the compatibilizer. The other polyglycol is thus made miscible in the polyoxymethylene by the compatibilizer.

In one form of the composition, the polyoxymethylene polymer is a homopolymer of polyoxymethylene. In another form of the composition, the polyoxymethylene polymer is a copolymer of polyoxymethylene.

The compatibilizer is preferably selected from the group consisting of polyethylene glycols, ethylene glycol-propylene glycol copolymers, and alkoxy ethers of polyalkylene glycols.

The other polyglycol (not the compatibilizer) is preferably selected from the group consisting of glycol copolymers of ethylene oxide, propylene oxide, and butylene oxide; alkoxy ethers of polyalkylene glycols; diols; polyols; and polyol esters.

In one preferred form of the composition, the compatibilizer has a molecular weight of less than 2000. Another preferred form of the composition provides that the compatibilizer have a molecular structure that includes a plurality of hydroxyl radicals. In another aspect of the invention, the compatibilizer is soluble in water.

The mixture of polyglycols preferably comprises about six parts of the compatibilizer to about one part of the other polyglycol.

For one preferred embodiment, the compatibilizer comprises a polyethylene glycol having a molecular weight of about 600.

For another preferred form of the plastic composition, the other polyglycol comprises an ethylene oxide-propylene glycol monobutyl ether having a molecular weight of about 1600.

In yet another form of the plastic composition, the compatibilizer comprises a polyethylene glycol, and the other polyglycol comprises a propylene glycol monobutyl ether.

In still another embodiment, the compatibilizer comprises a polyethylene glycol, and the other polyglycol comprises an ethylene oxide-propylene oxide polyglycol.

A preferred embodiment for the plastic composition that exhibits a relatively low friction coefficient comprises about 80% by weight of the polyoxymethylene polymer, about 17% by weight of the compatibilizer, and about 3% by weight of the other polyglycol. In this preferred composition, the compatibilizer comprises a polyethylene glycol having a molecular weight of about 600. In addition, the other polyglycol comprises an ethylene oxide-propylene glycol monobutyl ether having a molecular weight of about 1600.

A composition in accordance with the present invention also comprises from about 75% to about 95% by weight of a polyoxymethylene polymer and from about 5% to about 25% by weight of a polyglycol that is selected for its characteristic solubility in acetal and for its characteristic tribological property as a lubricant.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
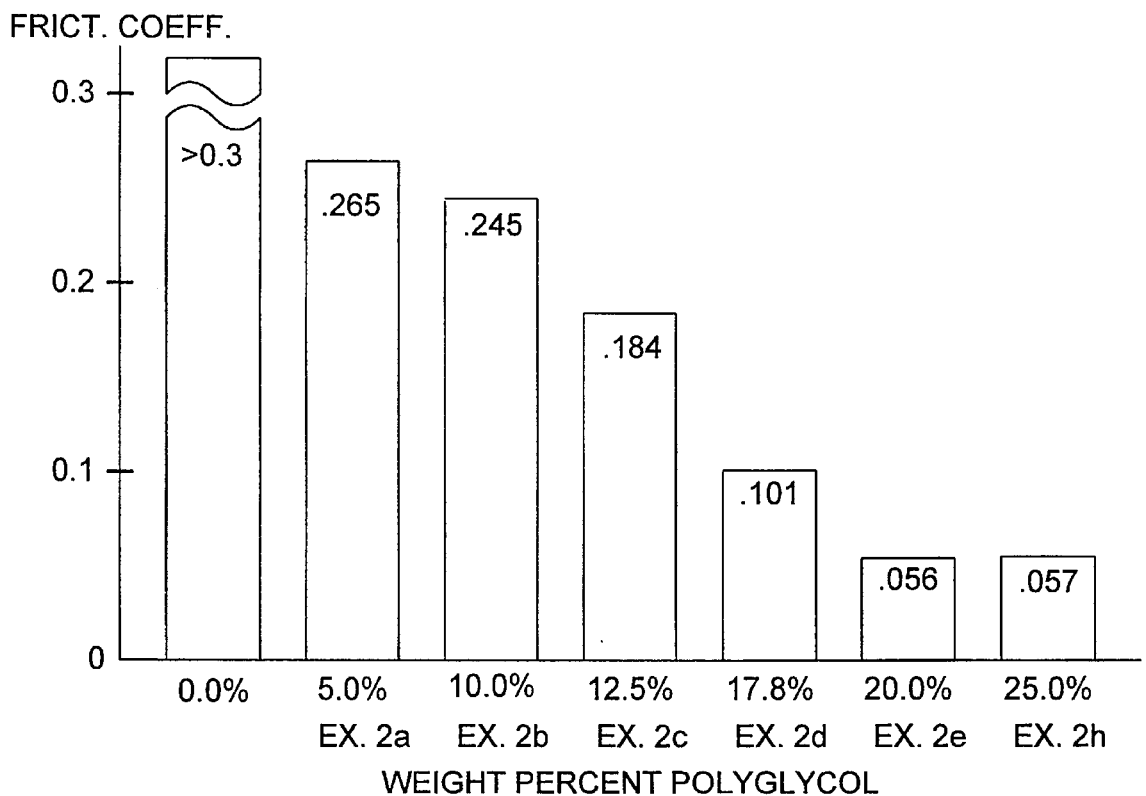
FIG. 1 is a bar graph showing the friction coefficient for various weight percentages of polyglycol prepared according to Example 2, and for pure acetal (i.e., without any polyglycols added)

The prior art discussed above teaches infusing lubricating oils into acetal, using another polymer that enhances the transport properties of the composition. In contrast, the present invention is directed to a solid lubricating composition that also uses acetal as a carder resin, but employs polyglycols as the lubricant. Certain types of polyglycols are known to have excellent lubricity characteristics. Generally, the members of the class of polyglycols known to have the best lubricity are miscible with mineral oils, but are insoluble in water and in acetals. Other polyglycols, characterized by a lower lubricity, are immiscible with mineral oil, yet soluble in water and to a certain degree, in acetals. Still other members of this class of polymers are partially soluble in oil and in water, but possess only limited solubility in acetals. It is generally accepted that the solubility characteristics of a polyglycol are dependent upon its molecular structure and correspond to its molecular weight.

The term "polyglycol" as used in the art encompasses glycols, polyethers, polyalkylene glycols, and polyoxyalkylene glycols. In this specification and in the claims that follow, the term is also intended to include diols, polyols, monoethers, diethers, and certain specified esters. The most common polyalkaline glycols are polyethylene glycol (PEG) and polypropylene glycol (PPG). Of the various PEGs that are known, only those in the lower molecular weight ranges are liquids, but they are not particularly good lubricants. By comparison, known PPGs are liquid over most of their molecular weight range and are substantially better lubricants than the PEGs. While PEGs are water soluble and soluble in acetals, the PPGs are oil soluble and water insoluble.

Another group of polyglycols discussed in this specification and referenced within the claims are the copolymers of PEG and PPG. These copolymers are available in a wide range of compositions and molecular weights. The solubility characteristics of such copolymers are predictable, based upon their compositions.

A third type of polyglycols discussed below in connection with the present invention includes monoethers, diethers, and certain esters. Generally, lubrication characteristics of a polyglycol are improved when one of the hydroxyl end groups on the polyglycol is replaced with an ether or an ester group.

Overview of the Present Invention

The following discussion is directed to three different embodiments of the invention. In the first embodiment, a single polyglycol is totally dissolved in polyoxymethylene polymer (hereafter referred to in the specification as acetal), producing a composition with substantially improved tribological performance, compared to acetal containing no polyglycol. However, it was discovered that this improvement in lubricity is not permanent. Due to the low viscosity and volatility of these polyglycols, they are too quickly lost from the acetal.

The second embodiment of the invention comprises a polyglycol with a high degree of solubility in acetal that is mixed in a composition with a water soluble polyglycol having superior lubricity characteristics or, with another liquid lubricant that is soluble in the first polyglycol. In this embodiment, it is essential that the first polyglycol and the second liquid that serves as a lubricant have a high degree of mutual solubility. The first polyglycol serves as a compatibilizer to enable the liquid lubricant to be successfully infused into the acetal. It has been observed that polyglycols and other liquid lubricants that are infused into acetals by applying high shear forces to the mixture, but lack appreciable solubility in the acetal, will bleed from the composition and inhibit the transport properties of the composition when it is processed in an injection mold to produce useful forms of the composition.

In the second embodiment, the acetal may comprise either a homopolymer such as DELRIN 500™, which is a general purpose acetal available from DuPont Chemical Company, or an acetal copolymer, such as one of those sold under the trade name CELCON™ by Hoechst-Celanese Corporation. The first polyglycol of the mixture of polyglycols may comprise a polyethylene polyglycol, such as E-600™, sold by Dow Chemical Company. Other polyglycols that can be used as compatibilizers include polyglycol EP530™, which is a polyether polyol having a molecular weight of 2000 sold by Dow Chemical Company, or polyglycol 15–200™, which is an ethylene-propylene glycol copolymer having an average molecular weight of approximately 2600, also sold by Dow Chemical Company. In compositions in accordance with the second embodiment of the invention, the E-600 serves as a compatibilizer for a synthetic lubricant, such as UCON fluid LB-300-X™, a propylene glycol monobutyl ether having a molecular weight of about 1100 and a viscosity of about 275 centiStokes at 40° C., sold by Union Carbide Corporation. Other types of synthetic lubricants that are water and oil soluble include UCON 50-HP-660™, which is an oxyethylene-oxypropylene monobutyl ether, having a viscosity of 132 centiStokes at 40° C., and UCON LB-70-X™, which is a propylene glycol monobutyl ether, also distributed by Union Carbide Corporation.

The third embodiment of the invention includes various copolymers of water soluble and oil soluble polyglycols that are infused into the acetal. The copolymer selected for this embodiment should have solubility characteristics that enable it to perform long-lasting lubricating functions without the need for a compatibilizer, but should be sufficiently soluble in the acetal to avoid transport problems that would interfere with forming the composition in an extruder or injection molding machine.

To prepare most of the examples described below, the following method was used. Pellets or powder of the acetal used in the composition were fed into the throat of a twin screw extruder under the conditions normally used and recommended in the art for extrusion of the acetal resin selected for the composition. At the same time, the compatibilizer and/or synthetic lubricant were pumped or otherwise fed into the extruder at a rate appropriate to produce the desired composition. The compatibilizer and/or lubricant were input to the extruder either through the same feedthroat as the acetal or through an appropriate port on the extruder disposed downstream of the feedthroat. The components of the composition were heated in the extruder with a temperature profile that increased from the feedthroat to the output port of the extruder. The plasticating and shearing action of the extruder acted upon these materials, infusing the compatibilizer and/or synthetic lubricant into the melted acetal polymer, producing an extrudate strand that was readily pelletized. These pellets can be processed by standard plastics processing methods, such as injection molding, to achieve their final form—assuming that transport problems do not interfere.

Use of a twin screw extruder is recommended for producing the composition, since introduction of the synthetic lubricating oils and acetal pellets or powder into the feedthroat of a single screw extruder is likely to result in excess lubrication of the screw and the barrel, to an extent sufficient to create transport problems. As noted above, oil on the flights and other operating portions of the extruder can reduce the friction applied to the feedstock below that necessary to force the material through the dies at the output port of the extruder. This transport problem, as noted above, can limit the ability to produce the composition or to process the pellets into a usable form.

Alternatively, it is also possible to use a two-stage single screw extruder for producing the composition of the present invention, so long as adequate mixing is provided in the second stage of the extruder. If a two-stage single screw extruder is used, the acetal pellets or powder would be fed into the extruder at the recommended measured rate. The first stage of the extruder will plasticate the acetal. Thereafter, the compatibilizer and/or synthetic lubricant should be pumped or otherwise fed into the extruder through a vent in the barrel at the beginning of the second stage. It is important that sufficient mixing of the acetal and other component(s) of the composition occur in the second stage to disperse and infuse the compatibilizer and/or synthetic lubricant into the melted acetal polymer. The required mixing is normally provided by using a screw having a Maddock mixer or similar device. The extrudate from the two-stage single screw extruder is then pelletized in the same manner as the extruded strand that is output from a twin screw extruder.

The samples made below were all produced using either a twin screw Berstorff extruder, Model ZE 25X33D, with co-rotating screws, produced by Herman Berstorff GMBH of Hannover, Germany, or a torque rheometer, sold under the trademark Plasti-Corder™ by Brabender Instruments, Inc. The Plasti-Corder includes an electrically heated sample chamber fitted closely around two irregularly-shaped rollers. An electrical motor turns the rollers in opposite directions, subjecting the mixture introduced into the chamber to a shearing force and mixing the mixture as the rollers rotate. Generally, it was determined that samples of the composition (with the same percentage components) made with the Berstorff extruder and with the Plasti-Corder were substantially identical in their physical characteristics, thereby demonstrating that the present invention can be made by any suitable conventional compounding process and machine.

Transport problems were encountered in injection molding samples from some of the compositions described in the following examples due to slippage in the molder barrel of the injection molding apparatus. Although these examples could not be injection molded to produce a test specimen, they were observed to be relatively hard and had an outer surface that was smooth, covered with a thin film of synthetic lubricant. Since these examples could not be molded into suitable specimens for testing with the available injection molding apparatus, no test results are provided for them. However, it is expected that they would exhibit significant performance improvements over acetal that does not contain a polyglycol lubricant, once the appropriate apparatus and technique are used to mold test specimens from them.

Specimens were made from the examples described below by injection molding each of the examples, where possible, to the dimensions specified in ASTM D 3702-90, "Standard Test Method For Wear Rate Of Materials In Self-Lubricated Rubbing Contact Using A Thrust Washer Testing Machine." Friction tests were run on each of the specimens according to the procedures specified in this Standard for all of the examples from which specimens could be made, and the friction coefficient data thus determined are listed below in Tables 1 through 5. In each case, the friction coefficient was determined at a contact stress, P, of 250 psi and at a velocity, V, of 100 feet per minute (PV=25,000 psi*fpm).

A plurality of examples of the composition in accordance with the present invention are described below. Examples 1a through 1f all comprise a mixture of acetal and a single polyglycol. A more permanent improvement in tribological properties yielded a preferred example within the compositions of Examples 2a through 2h, all of which comprise mixtures of acetal and a first and second glycol. Examples 3a through 3f also comprise a mixture of acetal and a first and second glycol, yielding more permanent improved lubricating properties; however, the second glycol is different than that used in Examples 2a through 2h. Examples 4 through 9 all comprise other mixtures of acetal and a first and second polyglycol. Examples 10 through 14 include acetal mixed with a single polyglycol synthetic lubricant.

EXAMPLES 1a through 1f

Pellets of a general purpose molding and extrusion grade of a polyoxymethylene homopolymer (acetal), distributed under the trademark DELRIN 500™ by DuPont Corporation, were mixed with a liquid polyethylene glycol having an average molecular weight of 600. This polyethylene glycol is distributed under the trademark E-600™ (referred to below simply as "E-600") by Dow Chemical. The examples included these two components in the various percent by weight proportions shown below in Table 1.

TABLE 1

| | COMPOSITIONS OF EXAMPLE 1 | | | |
|---|---|---|---|---|
| Example | % DELRIN 500 | % E-600 | Comp. Machine | Friction Coeff. |
| 1a | 95 | 5 | Berstorff | 0.219 |
| 1b | 90 | 10 | Berstorff | 0.056 |
| 1c | 80 | 20 | Plasti-Corder | 0.058 |
| 1d | 80 | 20 | Berstorff | 0.059 |
| 1e | 75 | 25 | Berstorff | 0.070 |
| 1f | 75 | 25 | Plasti-Corder | — |

In Examples 1a, 1b, 1d, and 1e, the acetal pellets were first reduced to a coarse powder by grinding using a conventional plastic grinder. Thereafter, a mixture of the acetal powder and the E-600 were compounded in the Berstorff extruder. During the compounding operation, the Berstorff extruder was operated at a screw speed of 250 rpm, with a temperature profile increasing from 185° C. at the feedthroat to 250° C. at the output port die. These examples of the composition were formed by the extruder into a strand, cooled, and pelletized into a feedstock suitable for injection molding. A portion of the pelletized feedstock for each example was then formed into test samples to measure friction coefficient and other parameters indicative of their tribological properties.

Examples 1c and 1f were made by mixing the coarse powder produced by grinding the acetal pellets with the E-600, producing a mixture having the consistency of wet sand. Fifty grams of the mixture was then introduced into the Plasti-Corder. In processing the mixture in the Plasti-Corder, the chamber was held at a temperature of 205° C. and the mixture of acetal and E-600 was introduced at a slow rotational speed of the rollers. Once the mixture had begun to melt, the speed was increased to 200 rpm and held there for two minutes. Rotation was stopped and the molten sample was removed and allowed to cool and solidify. Thereafter, a second 50 gram sample was produced by the identical process and then combined with the first sample. Once the two samples had cooled to room temperature, they were ground into coarse granules suitable for introduction into an injection molding machine, and test specimens were produced by injection molding.

EXAMPLES 2a through 2h

For producing examples 2a through 2c and 2e through 2h, the same acetal (DELRIN 500) was used, as in Examples 1a through 1f. For Example 2d, a copolymer form of acetal was used (polyoxymethylene copolymer), which is sold under the trademark CELCON U10™ by Hoechst-Celanese Corporation. In all of the Example 2 compositions, E-600 is used as a compatibilizer to ensure that a second polyglycol is fully infused within the acetal. The second polyglycol added to form each of these examples was ethylene oxide-propylene glycol monobutyl ether, sold under the trademark UCON 50-HB-660™ by Union Carbide Chemicals and Plastics Company, Inc. The UCON 50-HB-660 has a molecular weight of 1590 and an approximate viscosity of 132 centiStokes at 40° C.; it is fully soluble in water, moderately soluble in acetal, but only slightly soluble in oil. The E-600 and the UCON 50-HB-660 are mutually soluble.

As noted below in Table 2, these two liquid polyglycols comprise from 20% to 95% by weight of the different examples listed and the relative amounts of the polyglycols varied between one part of 50-HB-660 to 2.3 parts of E-600, and from one part of 50-HB-660 to 9 parts of E-600.

Examples 2a, 2b, 2c, 2e, and 2h were made using the Berstorff extruder by following the same technique described in connection with producing Examples 1a, 1b, 1d, and 1e. Examples 2d, 2f, and 2g were made using the Plasti-Corder, following the same procedure described above in connection with Examples 1c and 1f. No difference in appearance or performance was noted between samples of the composition made with the Berstorff extruder and those made with the Plasti-Corder.

TABLE 2

| | COMPOSITIONS OF EXAMPLE 2 | | | | |
|---|---|---|---|---|---|
| Example | Acetal Type | % Acetal | % E-600 | % 50-HB-660 | Friction Coeff. |
| 2a | Homopolymer | 95.0 | 4.5 | 0.5 | 0.265 |
| 2b | Homopolymer | 90.0 | 9.0 | 1.0 | 0.245 |
| 2c | Homopolymer | 87.5 | 10.0 | 2.5 | 0.184 |
| 2d | Copolymer | 82.1 | 16.2 | 1.6 | 0.101 |
| 2e | Homopolymer | 80.0 | 18.0 | 2.0 | 0.056 |
| 2f | Homopolymer | 80.0 | 17.0 | 3.0 | 0.048 |
| 2g | Homopolymer | 80.0 | 14.0 | 6.0 | 0.053 |
| 2h | Homopolymer | 75.0 | 22.5 | 2.5 | 0.057 |

EXAMPLES 3a through 3f

In Examples 3a through 3f, a composition in accordance with the present invention was formed by combining acetal (DELRIN 500) with a mixture of E-600, and an oil soluble propylene glycol monobutyl ether sold under the trademark UCON LB-300-X™ by Union Carbide Chemicals and Plastics Company, Inc. UCON LB-300-X has a viscosity of approximately 60 centiStokes at 40° C. and an average molecular weight of 1100. The E-600 and UCON LB-300-X are mutually soluble in each other; however, UCON LB-300-X is not soluble in water or acetal, although it is fully soluble in oil. The concentration of UCON LB-300-X was varied in these examples from about 13.5% of the total polyglycol weight to about 25% of the total polyglycol weight, as shown below in Table 3. Examples 3a, 3b, 3d, and 3f were made using the Berstorff extruder, following the technique described above in connection with Examples 1a, 1b, 1d, and 1e. Examples 3c and 3e were compounded using the Plasti-Corder, following the same procedure used in connection with Examples 1c and 1f, as described above.

TABLE 3

COMPOSITIONS OF EXAMPLE 3

| Example | % DELRIN 500 | % E-600 | % LB-300 | Friction Coeff. |
|---|---|---|---|---|
| 3a | 80.0 | 17.0 | 3.0 | — |
| 3b | 80.0 | 15.5 | 4.5 | — |
| 3c | 80.0 | 14.2 | 5.8 | — |
| 3d | 78.1 | 17.5 | 4.4 | — |
| 3e | 77.7 | 18.6 | 3.6 | 0.125 |
| 3f | 75.0 | 20.0 | 5.0 | 0.052 |

When cooled, each of the examples immediately preceding comprised hard, smooth solids, with a film of polyglycol synthetic lubricant on their surface. However, Examples 3a through 3d in which the UCON LB-300-X comprised more than 15% of the total polyglycol weight could not be processed by conventional injection molding, since excess slippage prevented samples from being formed. Nevertheless, as noted above, it is likely that these compositions can be made into useful objects by applying different manufacturing techniques and that such objects will exhibit improved tribological properties superior to acetals that do not contain the infused polyglycols.

EXAMPLE 4

In this example, made as described above in connection with Examples 1c and 1f, 80 pans by weight of the powdered acetal were mixed with 17 pans by weight of the E-600 and 3 parts of a polyol ester lubricant, which is sold under the trademark Emery Synthetic Base Stock 2935™, or Emery 2935™, by Henkel Corporation. The polyol ester is not soluble in either water or acetal, but is fully soluble in oil.

The mixture was processed under the same conditions as those used to produce each of the Examples 1c and 1f, in the Plasti-Corder, yielding a homogeneous composition, which formed a surface film of oil upon cooling to room temperature. Due to transport problems in the injection molder resulting from slippage of the composition in the molder barrel, test specimens were formed from this example with some difficulty. Data for this example are included below in Table 4.

EXAMPLES 5a and 5b

An Example 5a was formed according to the procedure of Example 4, by using 80 pans of powdered acetal (DELRIN 500) and 17 pans of E-600 mixed with 3 pans of an ethylene oxide-propylene oxide polyglycol copolymer having a molecular weight of 2600, which is sold under the trademark Polyglycol 15-200™ by Dow Chemical Company. Transport problems were not encountered in molding test specimens from this composition, and test data are shown below in Table 4.

Example 5b was formed in a similar manner as Example 5a, using reversed portions of the two polyglycols, i.e., 17 parts by weight of the polyglycol 15-200 and 3 pans of the E-600. The resulting composition had an appearance similar to that of Example 5a; however, test specimens could not be molded because of slippage in the molder barrel. Data for this example are also shown below in Table4.

EXAMPLE 6

Using the same procedure described above in connection with producing Example4, an example was made using 82parts of powdered acetal (DELRIN 500) and 15 parts of the polyglycol 15-200 that was used in Examples 5a and 5b, mixed with 3 parts of the oil soluble polyglycol of Example 3, i.e., LB-300-X. The resulting composition exhibited physical properties similar to that of the previous examples, and its surface was covered with a film of oil. Unfortunately, test specimens could not be molded due to slippage in the molder barrel. Data for this example are listed below in Table 4.

EXAMPLE 7

The procedures explained above in connection with Example 4 were used in forming the composition of Example 7. Example 7 was made with 80 parts of powdered acetal (DELRIN 500), 17 parts of E-600, and 3 parts of an ethylene oxide-propylene oxide polyglycol sold by Dow Chemical Company under the trademark Polyglycol EP530™. Polyglycol EP530 has a molecular weight of approximately 2000 and a viscosity of approximately 150 centiStokes at 40° C. Again, due to slippage in the molder barrel, test specimens could not be made from Example 7. Data relating to Example 7 are listed in Table 4.

EXAMPLES 8a through 8c

These examples were made using the Berstorff extruder following the same procedures used in connection with Examples 1a, 1b, 1d, and 1 e. Examples 8a through 8c were compounded with from 80 to 82 parts of powdered acetal (DELRIN 500) mixed with 50-HB-660, a water soluble polyglycol, and with an oil soluble polyglycol, LD-300-X. The percentage of the oil soluble polyglycol in the total polyglycol component of the composition was varied from 15% in Example 8a to 50% in Example 8c. Once again, difficulties in molding the test specimens caused by slippage were encountered in all three examples and it was only possible to make specimens for Example 8b. Data related to the three examples are listed below in Table 4.

EXAMPLE 9

Following the procedure used to make Example 4, a composition was formed using 85 parts of powdered acetal (DELRIN 500), 10 parts of oil soluble polyglycol LB-300-X and 5 parts of ethylene oxide-propylene oxide polyglycol EP-530 (used in Example 7). The resulting composition exhibited properties similar to that of the previous examples, possessing a film of surface oil. Due to slippage in the molder barrel, it was not possible to form test specimens. Data for this example are listed below in Table 4.

TABLE 4

COMPOSITIONS OF ACETAL & TWO POLYGLYCOLS

| Example | % Acetal | Polyglycol No. 1 Type | % | Polyglycol No. 2 Type | % | Friction Coeff. |
|---|---|---|---|---|---|---|
| 4 | 80.0 | E-600 | 17.0 | 2935 | 3.0 | 0.104 |
| 5a | 80.0 | 15-200 | 17.0 | E-600 | 3.0 | — |
| 5b | 80.0 | E-600 | 17.0 | 15-200 | 3.0 | 0.072 |
| 6 | 82.0 | 15-200 | 15.0 | LB-300-X | 3.0 | — |
| 7 | 80.0 | E-600 | 17.0 | EP-530 | 3.0 | — |
| 8a | 80.0 | 50-HB-660 | 17.0 | LB-300-X | 3.0 | — |
| 8b | 82.0 | 50-HB-660 | 14.0 | LB-300-X | 4.0 | 0.138 |
| 8c | 84.0 | 50-HB-660 | 8.0 | LB-300-X | 8.0 | — |
| 9 | 85.0 | LB-300-X | 10.0 | EP-530 | 5.0 | — |

NOTE—In the above Table 4, friction coefficient data are not shown for the examples for which test specimens could not be formed due to transport problems (slippage in the injection molder barrel).

EXAMPLE 10

A composition was formed using the Berstorff extruder following the procedures used to make Examples 1a, 1b, 1d, and 1e, as described above. In Example 10, 80 parts of powdered acetal (DELRIN 500) were mixed with 20 parts of water soluble polyglycol 50-HP-660. Test specimens could be molded from this composition and the performance data are shown below in Table 5.

EXAMPLE 11

A composition was made following the procedure used to produce Example 4, as described above. Example 11 was made with 80 parts of powdered acetal (DELRIN 500) and 20 parts of diethylene glycol n-butyl ether, sold as Polyglycol DECISION BLOCK™ (hereinafter "Polyglycol DB"), by Dow Chemical Company. The molecular weight of Polyglycol DB is 162.2 and its viscosity at 40° C. is rated as "very low." Polyglycol DB is fully soluble in water and acetal, but insoluble in oil. The performance data for the test specimens molded from this composition are shown below in Table 5.

EXAMPLE 12

Following the same procedure used in Example 10, a composition was made with 85 parts of powdered acetal (DELRIN 500) and 15 parts of 15-200 polyglycol. After compounding, the composition had a smooth surface with a thin film of surface oil. It was not possible to form test specimens, due to slippage of the composition in the molder barrel. Data for this example are also shown in Table 5.

EXAMPLE 13

Following the same procedures used in producing Example 4, an example was made with 87.5 parts of powdered acetal (DELRIN 500) and 12.5 parts of propylene glycol monobutyl ether, sold under the trademark UCON Lubricant LB-70-X™ by Union Carbide Chemicals and Plastics Company, Inc. This example also exhibited a smooth surface having a thin film of oil. Once again, as a result of slippage in the molder barrel, it was not possible to form test specimens. Data for the example are presented below in Table 5.

EXAMPLE 14

In accordance with the procedures used in Example 10, an example was made with 80 parts of powdered acetal (DELRIN 500) and 15 parts by weight of LB-300-X. This composition also had a smooth surface covered with a thin film of oil. Slippage in the molder barrel again precluded forming test specimens from this example. Data for the example are shown below in Table 5.

TABLE 5

COMPOSITIONS OF ACETAL INFUSED WITH
SINGLE POLYGLYCOL (COMPARED TO PURE ACETAL)

| Example | % Acetal | Type Polyglycol | % Polyglycol | Friction Coeff. |
|---|---|---|---|---|
| — | 100.0 | — | — | >0.3 |
| 1c | 80.0 | E-600 | 20 | 0.058 |
| 1d | 75.0 | E-600 | 25 | 0.070 |
| 10 | 80.0 | 50-HB-600 | 20 | 0.117 |
| 11 | 80.0 | DB | 20 | 0.059 |
| 12 | 85.0 | 15-200 | 15 | — |
| 13 | 87.5 | LB-70-X | 12.5 | — |
| 14 | 80.0 | LB-300-X | 20 | — |

NOTE—In the above Table 5, friction coefficient data are not shown for the examples for which test specimens could not be formed due to transport problems (slippage in the injection molder barrel).

Discussion of Tests Results

Referring to FIG. 1, the friction coefficients determined from the test of specimens made from the composition of Examples 2a through 2e and 2h are shown for comparison to the friction coefficient of a specimen made of acetal that does not include polyglycol. As will be evident from FIG. 1, the friction coefficient for pure acetal (i.e., without polyglycol) is greater than 0.3. A significant reduction in the friction coefficient is derived from adding only 5% by weight of polyglycol to the acetal, as shown in connection with Example 2a. The lowest friction coefficient shown in FIG. 1, 0.56, was obtained for Example 2e, which included 20% by weight of polyglycol. In this example, the polyglycol component was divided between 18% by weight of the E-600 and 2% by weight of UCON 50-HB-660 (ethylene oxide-propylene glycol monobutyl ether).

Figure 2:
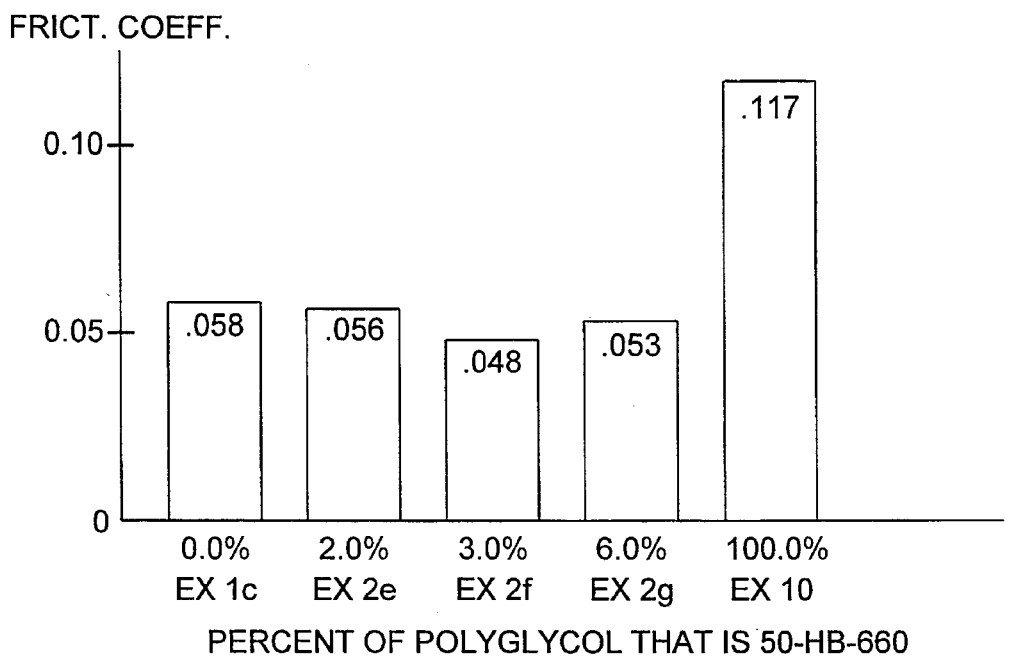
FIG. 2 is a bar graph showing the friction coefficient for compositions made in accordance with the present invention, as a function of the percent of the glycol in the composition that is ethylene oxide-propylene glycol monobutyl ether (of type 50 HB-660, distributed by Union Carbide, Chemicals and Plastics Company, Inc.)

In FIG. 2, the friction coefficient is shown for examples of the composition including several different percentages of (ethylene oxide-propylene glycol monobutyl ether). Example 1c is included because, although it has a relatively low friction coefficient, it includes no UCON 50-HB-660 (ethylene oxide-propylene glycol monobutyl ether). Similarly, Example 10 is included because the UCON 50-HB-660 comprising it represents 100% of the total polyglycol content of the composition (20% by weight of the total composition). The lowest friction coefficient shown in FIG. 2, 0.048, was achieved by Example 2f, which included 3% by weight of the UCON 50-HB-660 (ethylene oxide-propylene glycol monobutyl ether) and 70% by weight of polyethylene glycol (E-600).

Figure 3:
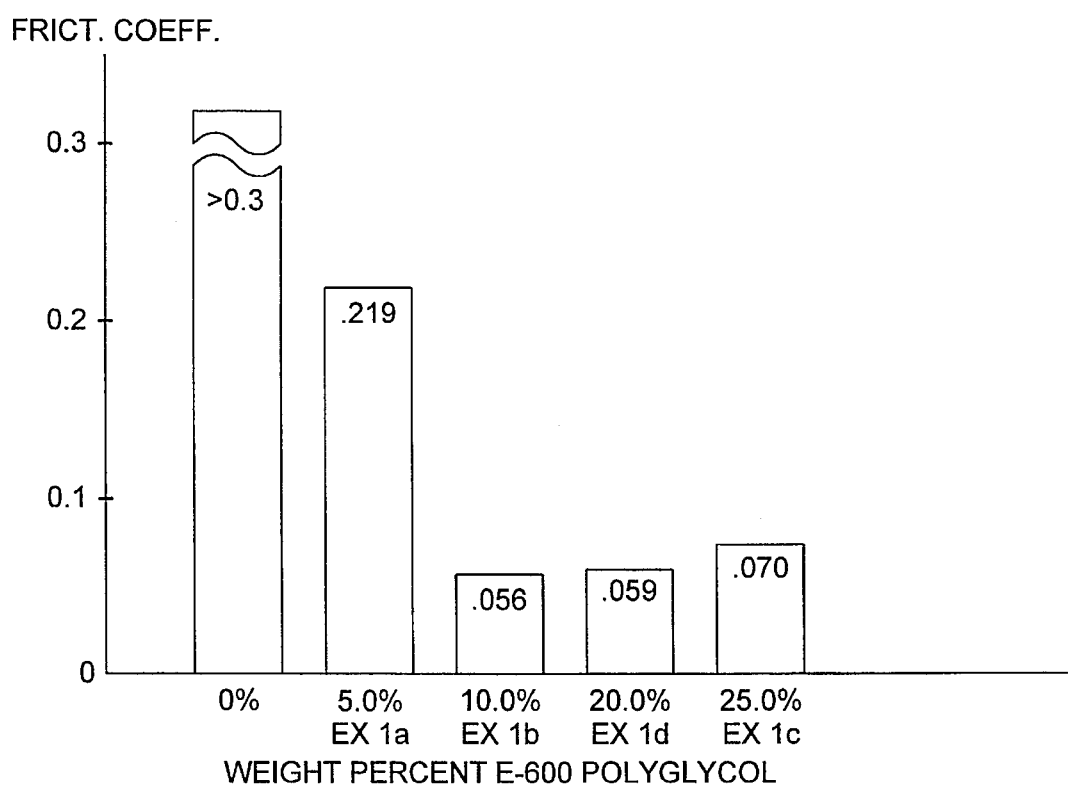
FIG. 3 is a bar graph showing the friction coefficient for compositions prepared according to Example 1, as a function of the weight percent of polyglycol in the composition (of type E-600, distributed by Dow Chemical Company), and for pure acetal.

Although the compositions made in accordance with Examples 1a through 1f are less desirable because the tribological improvement provided by the polyethylene glycol (E-600) quickly degrades, it will be apparent by reference to FIG. 3 that a significant improvement in reduced friction coefficient is achieved by adding even 5% of the polyethylene glycol to the acetal. Of the Examples 1a, 1b, 1d, and 1c that are shown in FIG. 3, the best result is achieved by Example 1b, which comprises 10% by weight of polyethylene glycol, having a friction coefficient of 0.056.

Figure 4:
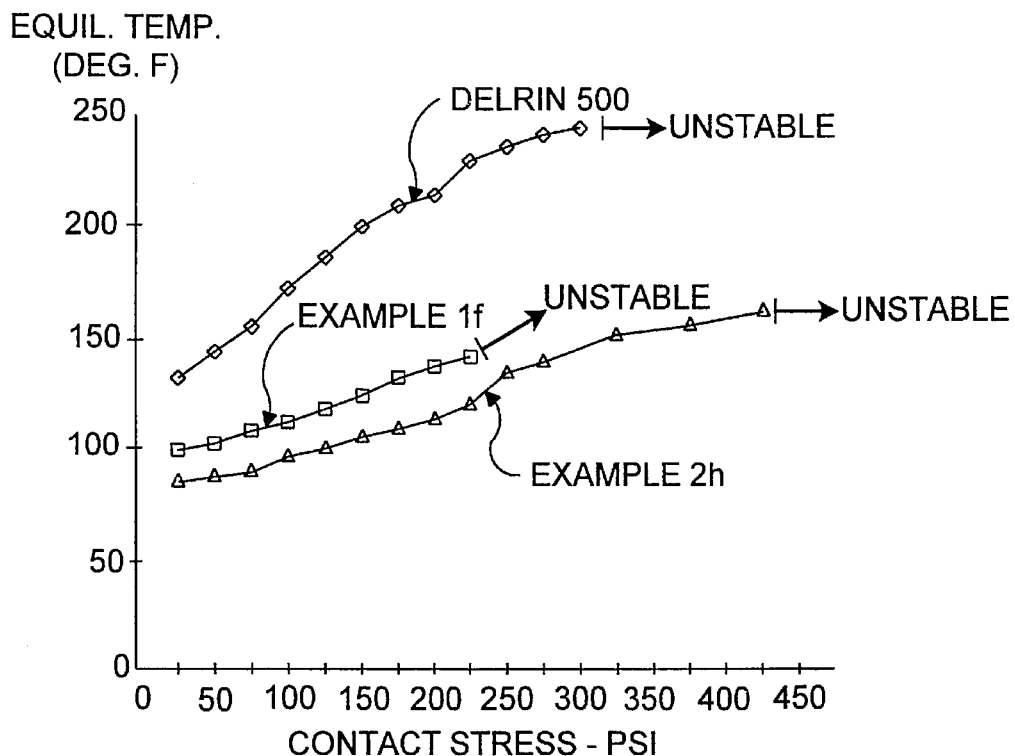
FIG. 4 is a graph showing the equilibrium temperature for specimens of pure acetal and two samples of the present composition, as a function of contact stress.

In FIG. 4, the equilibrium temperature in degrees Fahrenheit of pure acetal (DELRIN 500) that includes no polyglycol is compared to that for specimens of Examples 1f and 2h, at various contact stress levels (psi). The data for the pure acetal are represented by a series of linked diamonds; for Example 1f, the data are represented by linked squares, and for Example 2h, by linked triangles. Although the addition of polyethylene glycol (E-600) to the acetal substantially reduced its equilibrium temperature under stress, compared to the pure acetal, Example 1f became unstable at contact stresses in excess of about 225 psi. Superior results were exhibited by specimens of Example 2h, both in regard to the maximum contact stress withstood, and in reduced equilibrium temperatures at each stress level.

Figure 5:
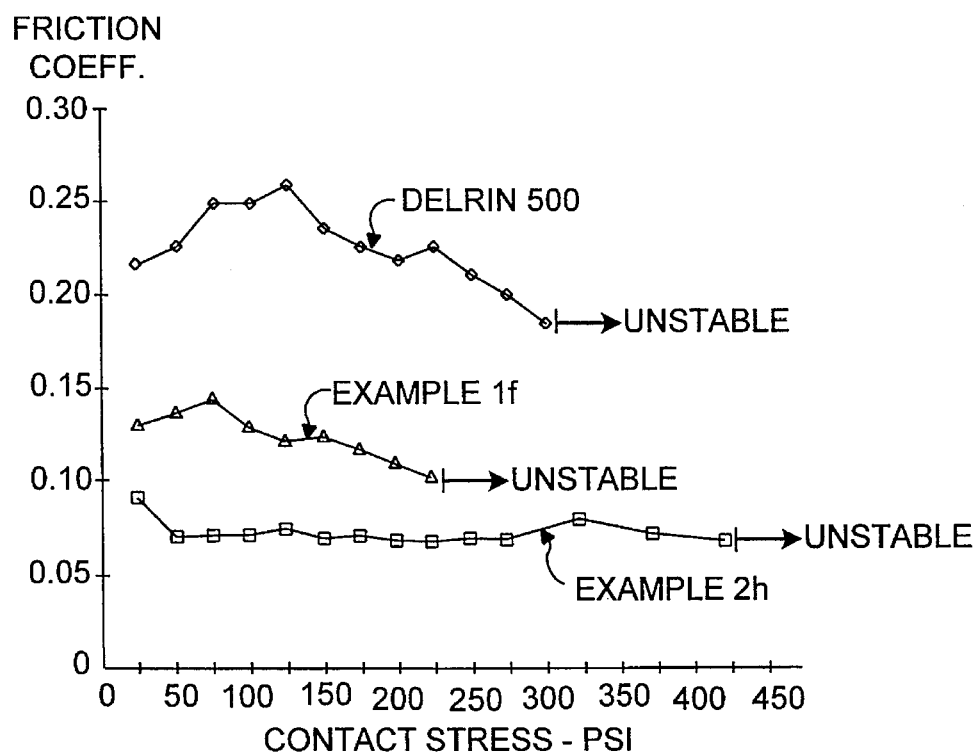
FIG. 5 is a graph showing the coefficient of friction of pure acetal and two samples of the present composition, as a function of contact stress.

Similarly, in FIG. 5, the friction coefficients at various contact stress levels are shown for pure acetal (DELRIN 500), and for test specimens produced from the composition of Examples 1f and 2h. The data are represented by the same symbols as in FIG. 4. It should be noted that Example 2h, in particular, maintained a relatively low friction coefficient as the contact stress level increased, until the composition became unstable at approximately 425 psi. By comparison, the pure acetal exhibited a substantially higher friction coefficient.

It is thus evident that the infusion of various types of polyglycols into acetals as provided in accordance with the present invention significantly reduces the friction coefficient of specimens made from the composition, compared to the pure acetal. However, the mechanical properties of the acetal resin may be adversely affected by the addition of the polyglycols, due to the change in the physical characteristics caused by such addition. To counteract this effect, it is contemplated that reinforcing fibers and powders of the types conventionally employed in strengthening and stiffening thermal plastic resins can also be employed in connection with the present compositions to restore properties that are modified by the infusion of the compatibilizer and/or synthetic lubricant polyglycols. Appropriate reinforcing fibers and powders include glass, carbon, graphite, and aramid fibers, and mica and other mineral powders. Furthermore, other methods for improving the tribological performance of acetal resins may be used in conjunction with this invention, such as the inclusion of solid lubricants.

Although the present invention has been described in connection with the preferred form of practicing it, it will be understood by those of ordinary skill in the art that many modifications can be made thereto within the scope of the claims that follow. Accordingly, it is not intended that the scope of the invention in any way be limited by the above description, but that it be determined entirely by reference to the claims that follow.

The invention in which an exclusive right is claimed is defined by the following:

1. A self lubricating plastic composition comprising:
   (a) from about 75% by weight to about 95% by weight of a polyoxymethylene polymer; and
   (b) from about 5% by weight to about 25% by weight of a mixture of polyglycols comprising:
       (i) at least one polyglycol serving as a compatibilizer because of its solubility in the polyoxymethylene polymer; and
       (ii) another polyglycol having a coefficient of friction that is less than that of both the polyoxymethylene polymer and the compatibilizer and sufficiently soluble in said compatibilizer to be made miscible in the polyoxymethylene by the compatibilizer.

2. The plastic composition of claim 1, wherein the polyoxymethylene polymer is a homopolymer of polyoxymethylene.

3. The plastic composition of claim 1, wherein the polyoxymethylene polymer is a copolymer of polyoxymethylene.

4. The plastic composition of claim 1, wherein said compatibilizer is selected from the group consisting of polyethylene glycols, ethylene glycol-propylene glycol copolymers, and alkoxy ethers of polyalkylene glycols.

5. The plastic composition of claim 1, wherein said another polyglycol is selected from the group consisting of glycol copolymers of ethylene oxide, propylene oxide, and butylene oxide; alkoxy ethers of polyalkyl glycols; and polyol esters.

6. The plastic composition of claim 1, wherein the compatibilizer has a molecular weight less than 2000.

7. The plastic composition of claim 1, wherein the compatibilizer is soluble in water.

8. The plastic composition of claim 1, wherein the mixture of polyglycols comprises about six parts of the compatibilizer to about one part of said another polyglycol.

9. The plastic composition of claim 1, wherein the compatibilizer comprises a polyethylene glycol having a molecular weight of about 600.

10. The plastic composition of claim 1, wherein the other polyglycol comprises an ethylene oxide-propylene glycol monobutyl ether having a molecular weight of about 1600.

11. The plastic composition of claim 1, wherein the compatibilizer comprises a polyethylene glycol, and the other polyglycol comprises a propylene glycol monobutyl ether.

12. The plastic composition of claim 1, wherein the compatibilizer comprises a polyethylene glycol, and the other polyglycol comprises an ethylene oxide-propylene oxide polyglycol.

13. The plastic composition of claim 1, wherein the composition comprises about 80% by weight of the polyoxymethylene polymer, about 17% by weight of the compatibilizer, and about 3% by weight of said another polyglycol.

14. The plastic composition of claim 13, wherein the compatibilizer comprises a polyethylene glycol having a molecular weight of about 600.

15. The plastic composition of claim 13, wherein said another polyglycol comprises an ethylene oxide-propylene glycol monobutyl ether having a molecular weight of about 1600.

16. An internally lubricated plastic composition consisting essentially of from about 75% to about 95% by weight of a polyoxymethylene polymer and from about 5% to about 25% by weight of a polyglycol selected from the group consisting of: ethylene oxide-propylene glycol butyl ethers, diethylene glycol butyl ethers, propylene glycol butyl ethers, and oil soluble polyol esters, said polyglycol being selected for its solubility in acetal and for its lubricant properties.

17. The internally lubricated plastic composition of claim 16, wherein the polyoxymethylene polymer is a homopolymer of polyoxymethylene.

18. The internally lubricated plastic composition of claim 16, wherein the polyoxymethylene polymer is a copolymer of polyoxymethylene.

19. The internally lubricated plastic composition of claim 16, wherein the polyglycol has a molecular weight of about 600.

20. The internally lubricated plastic composition of claim 19, comprising from about 80% by weight to about 90% by weight of the polyoxymethylene polymer and from about 20% by weight to about 10% by weight of the polyethylene glycol, said plastic composition having a characteristic coefficient of friction that is substantially less than 0.1, as measured in a thrust washer tester at a pressure-velocity of about 25,000 pounds per square inch-feet per minute.

21. The internally lubricated plastic composition of claim 16, wherein the diethylene glycol butyl ether has a molecular weight less than 200.

22. An internally lubricated plastic composition comprising from about 75% to about 95% by weight of a polyoxymethylene polymer, and from about 5% to about 25% by weight of a glycol that is selected for its lubricant properties from the group consisting of: glycol copolymers of butylene oxide, ethylene oxide-propylene glycol butyl ethers, alkoxy ethers of copolymers of polyethylene oxide and polypropylene oxide, ethylene glycol butyl ethers, and oil soluble polyol esters, said glycol being dispersed in the polyoxymethylene by applying a shear to the composition and by heating the composition, said glycol bleeding from a surface of the composition over time, to form a lubricant film on the surface of the composition.

23. The internally lubricated plastic composition of claim 22, wherein the composition is heated to a temperature of at least 200° C. to disperse the glycol in the polyoxymethylene.

24. The internally lubricated plastic composition of claim 22, wherein the glycol has a molecular weight that is less than 1000.

25. The internally lubricated plastic composition of claim 22, wherein the ethylene oxide-propylene glycol butyl ether has a molecular weight less than 2000.

26. The internally lubricated plastic composition of claim 22, wherein the ethylene glycol butyl ether has a molecular weight less than 200.

27. The internally lubricated plastic composition of claim 22, further comprising a reinforcing material in one of a powder and a fiber form.

28. The internally lubricated plastic composition of claim 27, wherein said reinforcing material is selected from the group consisting of: glass, carbon, graphite, and aramid.

* * * * *